United States Patent
Peterson et al.

(10) Patent No.: US 12,206,951 B2
(45) Date of Patent: Jan. 21, 2025

(54) SYSTEMS AND METHODS FOR PRESENTING USER SELECTED SCENES

(71) Applicant: Adeia Guides Inc., San Jose, CA (US)

(72) Inventors: Brian Peterson, Barrington, IL (US); Vanessa Wickenkamp, Elmhurst, IL (US); David John Wheatley, Tower Lakes, IL (US); Walter R. Klappert, North Hollywood, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/227,007

(22) Filed: Jul. 27, 2023

(65) Prior Publication Data

US 2023/0379549 A1 Nov. 23, 2023

Related U.S. Application Data

(63) Continuation of application No. 16/700,209, filed on Dec. 2, 2019, now Pat. No. 11,758,235, which is a continuation of application No. 15/927,991, filed on Mar. 21, 2018, now Pat. No. 10,531,159, which is a continuation of application No. 14/502,851, filed on Sep. 30, 2014, now abandoned.

(51) Int. Cl.
*H04N 21/482* (2011.01)
*H04N 21/81* (2011.01)
*H04N 21/845* (2011.01)
*H04N 21/8541* (2011.01)

(52) U.S. Cl.
CPC ..... *H04N 21/4821* (2013.01); *H04N 21/4825* (2013.01); *H04N 21/8133* (2013.01); *H04N 21/8456* (2013.01); *H04N 21/8541* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward et al. |
| 7,165,098 B1 | 1/2007 | Boyer et al. |
| 7,536,706 B1 | 5/2009 | Sezan et al. |
| 7,693,871 B2 | 4/2010 | Barrs et al. |
| 7,761,892 B2 | 7/2010 | Ellis et al. |
| 8,046,801 B2 | 10/2011 | Ellis et al. |
| 8,526,782 B2 | 9/2013 | Kaiser et al. |

(Continued)

*Primary Examiner* — Alexander Q Huerta
(74) *Attorney, Agent, or Firm* — Haley Guiliano LLP

(57) ABSTRACT

Systems and methods are described herein for presenting user selected scenes. A media guidance application may generate for display a listing for a media asset, wherein a play length of the media asset includes a non-selectable play length portion and a selectable play length portion. The media guidance application may generate for display a first scene option corresponding to a first scene and a second scene option corresponding to a second scene. The media guidance application may receive a user selection of the first or second scene option and incorporate the selected scene into the selectable play length portion of the media asset. The media guidance application may generate for display the media asset with the selected scene incorporated into the selectable play length portion.

20 Claims, 7 Drawing Sheets

(56) References Cited

U.S. PATENT DOCUMENTS

| | | | |
|---|---|---|---|
| 8,650,489 | B1 | 2/2014 | Baum et al. |
| 8,677,410 | B2 | 3/2014 | Kline |
| 8,793,721 | B1 | 7/2014 | Sharkey et al. |
| 9,418,702 | B1 | 8/2016 | Arepalli |
| 9,930,405 | B2 | 3/2018 | Peterson et al. |
| 11,012,760 | B2 * | 5/2021 | Kingori .............. H04N 21/8456 |
| 11,395,032 | B2 | 7/2022 | Sen |
| 11,758,235 | B2 | 9/2023 | Peterson et al. |
| 2002/0053089 | A1 | 5/2002 | Massey |
| 2002/0105535 | A1 | 8/2002 | Wallace et al. |
| 2002/0108109 | A1 | 8/2002 | Harris et al. |
| 2002/0174430 | A1 | 11/2002 | Ellis et al. |
| 2003/0046638 | A1 * | 3/2003 | Thompson ........... H04N 21/458 |
| 2003/0110499 | A1 | 6/2003 | Knudson et al. |
| 2005/0091597 | A1 * | 4/2005 | Ackley .............. H04N 21/4622 |
| | | | 715/717 |
| 2005/0251827 | A1 | 11/2005 | Ellis et al. |
| 2006/0064733 | A1 * | 3/2006 | Norton .............. H04N 21/42646 |
| | | | 725/135 |
| 2006/0130119 | A1 * | 6/2006 | Candelore .............. H04N 7/163 |
| | | | 725/135 |
| 2006/0130121 | A1 | 6/2006 | Candelore et al. |
| 2007/0220583 | A1 * | 9/2007 | Bailey ................. H04N 21/812 |
| | | | 725/135 |
| 2007/0300273 | A1 * | 12/2007 | Turner .................. H04H 20/38 |
| | | | 725/136 |
| 2008/0115161 | A1 | 5/2008 | Kurzion |
| 2010/0110200 | A1 * | 5/2010 | Lau ......................... G11B 27/11 |
| | | | 348/207.1 |
| 2010/0131983 | A1 | 5/2010 | Shannon et al. |
| 2010/0153885 | A1 | 6/2010 | Yates |
| 2010/0199295 | A1 * | 8/2010 | Katpelly .................. G06N 5/04 |
| | | | 725/46 |
| 2011/0078740 | A1 | 3/2011 | Bolyukh et al. |
| 2012/0077175 | A1 | 3/2012 | Levisay et al. |
| 2012/0163770 | A1 | 6/2012 | Kaiser et al. |
| 2012/0213495 | A1 * | 8/2012 | Hafeneger ........... G11B 27/034 |
| | | | 386/E5.028 |
| 2012/0272185 | A1 | 10/2012 | Dodson et al. |
| 2013/0097643 | A1 | 4/2013 | Stone et al. |
| 2013/0324192 | A1 | 12/2013 | Lee et al. |
| 2014/0047413 | A1 | 2/2014 | Sheive et al. |
| 2014/0053180 | A1 | 2/2014 | Shoykher |
| 2014/0087356 | A1 | 3/2014 | Fudemberg |
| 2014/0089999 | A1 | 3/2014 | Moradian |
| 2014/0108309 | A1 | 4/2014 | Frank et al. |
| 2014/0130080 | A1 * | 5/2014 | Badoiu ............... G06F 16/9535 |
| | | | 725/24 |
| 2014/0241704 | A1 | 8/2014 | Delpuch et al. |
| 2015/0149583 | A1 | 5/2015 | Chung |
| 2015/0181301 | A1 | 6/2015 | Bloch et al. |
| 2015/0205511 | A1 | 7/2015 | Vinna et al. |
| 2015/0234571 | A1 | 8/2015 | Lee et al. |
| 2015/0293675 | A1 * | 10/2015 | Bloch ................. G06F 3/04842 |
| | | | 715/723 |
| 2015/0293677 | A1 | 10/2015 | Fong |
| 2015/0356347 | A1 | 12/2015 | Egerton |
| 2016/0094875 | A1 | 3/2016 | Peterson et al. |
| 2017/0245023 | A1 * | 8/2017 | Brelis ................ H04N 21/4627 |
| 2019/0206444 | A1 * | 7/2019 | Bates .................. H04N 21/435 |
| 2020/0037048 | A1 | 1/2020 | Cheung et al. |
| 2020/0243116 | A1 * | 7/2020 | Lee .................... H04N 21/8456 |

\* cited by examiner

SYSTEMS AND METHODS FOR PRESENTING USER SELECTED SCENES

CROSS-REFERENCE TO RELATED APPLICATIONS

This application is a continuation of U.S. patent application Ser. No. 16/700,209, filed Dec. 2, 2019, which is a continuation of U.S. patent application Ser. No. 15/927,991, now U.S. Pat. No. 10,531,159, filed Mar. 21, 2018, which is a continuation of U.S. patent application Ser. No. 14/502,851, filed Sep. 30, 2014. The disclosures of which are hereby incorporated by reference herein in their entireties.

BACKGROUND

Media assets, such as television programs, are typically passively consumed by end users, with no additional interaction required by the end user. For example, a traditional television program comprises a series of scenes which are presented to the end user in a particular order. Every end user of the television program and rebroadcasts/replays of the television program may receive the same series of scenes in the same order as the original broadcast. However, certain scenes of the media asset may not be critical to a central plot of the media asset. The end user may wish to replace such non-critical scenes with alternate scenes that are more suitable to their preferences. Furthermore, the end user may wish to make such selections of alternate scenes in real time, during playback of the media asset, thus increasing the interaction with the media asset.

SUMMARY

Accordingly, systems and methods are described herein for presenting media assets with user selected scenes. For example, in order to increase the appeal of a particular media asset and/or to increase the appeal of repeated viewings of a particular media asset, a media guidance application may customize the content of the media asset to the tastes and/or preferences of the user. Moreover, the media guidance application may customize the media asset by replacing default scenes of a media asset with alternate scenes of the media assets.

While the default scenes of the media asset may include subject matter, viewpoints, characters, plot lines, etc., originally selected (e.g., by the creator of the media asset) to be depicted in the media asset, the media guidance application may replace one or more default scenes with one or more alternate scenes that include different or slightly modified subject matter, viewpoints, characters, plot lines, etc., than that presented in the default scenes. Furthermore, the alternate scenes may be selected by the user based on the particular subject matter, viewpoints, characters, plot lines, etc. that the user wishes to consume.

In addition, the media guidance application may present the user with options for the alternate scenes that inform the user about the particular subject matter, viewpoints, characters, plot lines, etc., found in each of the one or more alternate scenes. The options may be presented to the user before or during playback of the media asset, and the media guidance application may inform the user of not only the presence of the alternate scenes but also the location of the alternate scenes in the play length of the media asset.

According to one aspect, a media guidance application may present user selected scenes by generating for display a listing for a media asset, wherein a play length of the media asset includes a non-selectable play length portion and a selectable play length portion. For example, the media guidance application may include a portion with one or more default scenes that cannot be replaced with alternate scenes and a portion with one or more default scenes that can be replaced with alternate scenes.

The media guidance application may also generate for display a first scene option, wherein the first scene option corresponds to a first scene for incorporation into the selectable play length portion, and a second scene option, wherein the second scene option corresponds to a second scene for incorporation into the selectable play length portion. For example, the first scene and the second scene may represent alternate scenes with which the user can replace a default scene.

The media guidance application may receive a user selection of the first scene option or the second scene option. For example, the media guidance application may receive a user selection of a scene that corresponds to the particular subject matter, viewpoints, characters, plot lines, etc., with which the user wishes to view while consuming the media asset. In some embodiments, the user selection may be received before a broadcast time of the media asset and/or during playback of the media asset.

The media guidance application may further incorporate either the selected first scene or the selected second scene into the selectable play length portion of the media asset based on the user selection. For example, in response to a user selecting an alternate scene that features a particular character, the media guidance application may replace a default scene that features a different character in the media asset with the selected alternate scene.

The media guidance application may then generate for display the media asset with the either the selected first scene or the selected second scene incorporated into the selectable play length portion. For example, the media guidance application may begin playback of the media asset in which default scenes and any alternate scenes selected by the user are seamlessly intertwined.

In some embodiments, the first scene option may correspond to a default scene, and the second scene option may correspond to an alternate scene. For example, a first scene option may correspond to an editor's recommendation for viewing the media asset, and the second scene may correspond to a recommendation from another entity. Alternatively or additionally, the first scene may represent a scene that is automatically incorporated into the media asset if a user selection is not received.

In some embodiments, a play length of the first scene may equal the play length of the second scene. For example, the incorporation of an alternate scene may not affect the total play length of a media asset and/or the point in the play length of the media asset at which a different scene is scheduled to be presented.

In some embodiments, the selectable play length portion and/or the non-selectable play length portion may comprise one or more scenes of the media asset, and the selectable play length portion of the media asset may correspond to a portion of the play length in which one scene of a plurality of alternate scenes is incorporated. In some embodiments, the media asset may include a plurality of scenes, and the media guidance application may incorporate either the first scene or the second scene into the selectable play length portion by including the first scene or the second scene in the plurality of scenes. In some embodiments, the non-selectable play length portion and the selectable play length portion are presented in series during playback of the play length. For instance, the selectable play length and non-selectable play length may comprise one or more scenes that are presented in a particular order during playback of the media asset.

In some embodiments, the media guidance application may receive the user selection of the first scene or the second scene by receiving a user selection of an actor, genre, location, or topic that corresponds to the selected first scene or the selected second scene. For example, the user may indicate a favorite actor, and the media guidance application may automatically select either the first scene or the second scene associated with the indicated actor. In some embodiments, the media guidance application may automatically select a third scene for incorporation into a second selectable play length portion of the media asset. The third scene may correspond to either the selected first scene or the selected second scene. As an illustrative example, the third scene and the selected first or second scene may share a common characteristic, such as an actor, genre, theme, topic, or any other suitable characteristic. In some embodiments, the media guidance application may automatically select the third scene by comparing metadata associated with the selected first scene or the selected second scene to metadata associated with the third scene. The media guidance application may automatically select the third scene based on the metadata associated with the selected first scene or the selected second scene corresponding to the metadata associated with the third scene.

According to another aspect, the media guidance application may present user selected scenes by generating for display a progress bar for a media asset that graphically represents a user's progress through a play length of the media asset. For example, the progress bar may correspond to an on-screen graphic that indicates a point in the play length of the media asset at which that user is currently viewing.

The media guidance application may determine a location on the progress bar that corresponds to a first point in the play length at which the user is presented with an option to select one of a first scene and a second scene for incorporation into the media asset. For example, the media guidance application may determine that at the 15 minute mark in the play length of the media asset the user will be presented with the option to select one or more alternate scenes.

The media guidance application may generate for display a graphic representation of the option at the location. As an illustrative example, the media guidance application may overlay onto the progress bar an icon representing either one or both of the first and second scenes. In some embodiments, the graphic representation of the option may be generated for display during playback of the media asset and/or prior to playback of the media asset.

In some embodiments, playback of the media asset may be automatically paused at the first point in the play length, and the graphic representation of the option may be generated for display while the playback of the media asset is paused. For example, in response to determining that an alternate scene is available, the media guidance application may pause playback of the media asset in order to allow the user to select an alternate scene.

In some embodiments, the media guidance application may automatically select the first scene for display after a period of time subsequent to pausing the playback of the media asset. For example, the media guidance application may wait for a timeout period of time before automatically selecting a default scene for display.

In some embodiments, the graphic representation of the option may inform the user about the content of the alternate scenes. For example, the graphic representation of the option may include a first thumbnail corresponding to the first scene and a second thumbnail corresponding to the second scene. Alternatively or additionally, the graphic representation of the option may include a description of the first scene and a description of the second scene.

In some embodiments, the media guidance application may inform the user about the content of the alternate scenes upon the user selecting a graphic representation of that scene. For example, the media guidance application may generate for display a description of the first scene and a description of the second scene upon a user selection of the graphic representation of the option.

In some embodiments, the media guidance application may alert the user to the approach of a point in the play length of the media asset at which alternate scenes are available. For example, the media guidance application may graphically accentuate the graphic representation of the option as playback of the media asset nears the first point in the play length. For example, the media guidance application may graphically accentuate the graphic representation by altering the size, shape, color, animation, or otherwise graphically distinguishing the graphic representation.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
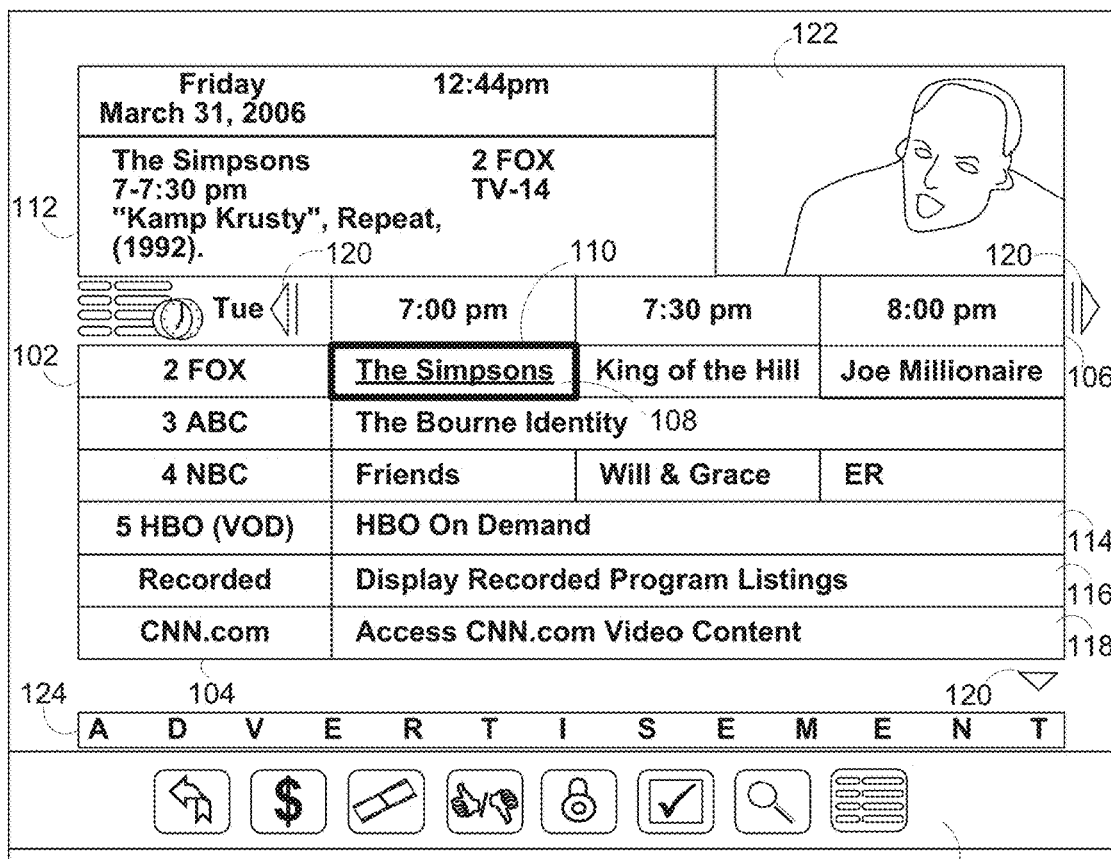
FIG. 1 shows an illustrative example of a display screen for use in accessing media content in accordance with some embodiments of the disclosure.

The amount of content available to users in any given content delivery system can be substantial. Consequently, many users desire a form of media guidance through an interface that allows users to efficiently navigate content selections, easily identify content that they may desire, and/or consume the selected content. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, text documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Systems and methods are described herein for presenting user selected scenes. Although the systems and methods described herein are discussed in relation to video programs, the systems and methods described herein may be utilized with any suitable type of media, including, but not limited to, video, audio, or images. As used herein, "scene" may refer to any unit of action or segment of a media asset, typically with a unified theme or topic. For example, a scene may refer to a specific chapter, setting, act, etc., of a media asset. In some embodiments, a scene may correspond to a particular portion of a media asset. For example, a particular scene may correspond to a point in the play length of the media asset at which the scene begins and a point in the play length of the media asset at which the scene ends. For example, the beginning of a scene may correspond to the thirty second mark in the play length of the media asset and the end of the scene may correspond to the one-minute mark of the play length of the media asset. Accordingly, the portion of the media asset that corresponds to the scene may be the portion of the media asset that corresponds from the thirty second mark in the play length of the media asset to the one-minute mark in the play length of the media asset.

A media guidance application may present user selected scenes by generating for display a listing for a media asset, wherein a play length of the media asset includes a non-selectable play length portion and a selectable play length portion. As used herein, a "portion" of a media asset may refer to any part, division, fragment, segment, or any other part of the media asset that is less than the entire media asset. For example, a portion of a media asset may refer to any part of the media asset with a playback length that is less than the entire play length of the media asset. A "non-selectable" play length portion may be a portion of the media asset that the end user may not select and/or interact with. For example, the non-selectable play length portion may be a portion of the media asset that has been originally selected (e.g., by the original creator of the media asset or by the content provider) and which may not be replaced by another scene. A "selectable" play length portion may be a portion of the media asset which an end user may replace with an alternate scene. For example, as discussed in further detail below, the media guidance application may generate for display options for alternate scenes, and the end user may select one of the alternate scenes for incorporation into the media asset.

As used herein, a "default" scene may be any scene which is scheduled to be incorporated into a media asset absent any input from the user. In some embodiments, the default scene may be a scene that has been originally selected for incorporation into the media asset, for example by the original creator of the media asset or by a content provider. An "alternate" scene may be any scene other than the default scene that may be incorporated into the media asset subsequent to a user request to incorporate the alternate scene. In some embodiments, the alternate scene may replace a corresponding default scene. The alternate scene may also have the same playback length as the default scene in order to facilitate the exchange of the default scene and the alternate scene.

The media guidance application may also generate for display a first scene option, wherein the first scene option corresponds to a first scene for incorporation into the selectable play length portion, and a second scene option, wherein the second scene option corresponds to a second scene for incorporation into the selectable play length portion. For example, the first scene and the second scene may represent alternate scenes with which the user can replace a default scene.

The media guidance application may receive a user selection of the first scene option or the second scene option. For example, the media guidance application may receive a user selection of a scene that corresponds to the particular subject matter, viewpoints, characters, plot lines, etc., with which the user wishes to view while consuming the media asset. In some embodiments, the user selection may be received before a broadcast time of the media asset and/or during playback of the media asset.

The media guidance application may further incorporate either the selected first scene or the selected second scene into the selectable play length portion of the media asset based on the user selection. For example, in response to a user selecting an alternate scene that features a particular character, the media guidance application may replace a default scene that features a different character in the media asset with the selected alternate scene.

The media guidance application may then generate for display the media asset with the either the selected first scene or the selected second scene incorporated into the selectable play length portion. For example, the media guidance application may begin playback of the media asset in which default scenes and any alternate scenes selected by the user are seamlessly intertwined.

In some embodiments, the first scene option may correspond to a default scene, and the second scene option may correspond to an alternate scene. For example, a first scene option may correspond to an editor's recommendation for viewing the media asset, and the second scene may correspond to a recommendation from another entity. Alternatively or additionally, the first scene may represent a scene that is automatically incorporated into the media asset if a user selection is not received.

In some embodiments, a play length of the first scene may equal the play length of the second scene. For example, the incorporation of an alternate scene may not affect the total play length of a media asset and/or the point in the play length of the media asset at which a different scene is scheduled to be presented.

In some embodiments, the selectable play length portion and/or the non-selectable play length portion may comprise one or more scenes of the media asset, and the selectable play length portion of the media asset may correspond to a portion of the play length in which one scene of a plurality of alternate scenes is incorporated. In some embodiments, the media asset may include a plurality of scenes, and the media guidance application may incorporate either the first scene or the second scene into the selectable play length portion by including the first scene or the second scene in the plurality of scenes. In some embodiments, the non-selectable play length portion and the selectable play length portion are presented in series during playback of the play length. For instance, the selectable play length and non-selectable play length may comprise one or more scenes that are presented in a particular order during playback of the media asset.

In some embodiments, the media guidance application may receive the user selection of the first scene or the second scene by receiving a user selection of an actor, genre, location, or topic that corresponds to the selected first scene or the selected second scene. For example, the user may indicate a favorite actor, and the media guidance application may automatically select either the first scene or the second scene associated with the indicated actor. In some embodiments, the media guidance application may automatically select a third scene for incorporation into a second selectable play length portion of the media asset. The third scene may correspond to either the selected first scene or the selected second scene. As an illustrative example, the third scene and the selected first or second scene may share a common characteristic, such as an actor, genre, theme, topic, or any other suitable characteristic. In some embodiments, the media guidance application may automatically select the third scene by comparing metadata associated with the selected first scene or the selected second scene to metadata associated with the third scene. The media guidance application may automatically select the third scene based on the metadata associated with the selected first scene or the selected second scene corresponding to the metadata associated with the third scene.

According to some embodiments, the media guidance application may present user selected scenes by generating for display a progress bar for a media asset that graphically represents a user's progress through a play length of the media asset. As used herein, a "progress bar" may be any indicator used to visualize a user's progress through a media asset. In some embodiments, a user's progress may be the furthest point in playback of a media asset that the user has consumed. For example, the progress bar may correspond to an on-screen graphic that indicates a point in the play length of the media asset at which the user is currently viewing.

The media guidance application may determine a location on the progress bar that corresponds to a first point in the play length at which the user is presented with an option to select one of a first scene and a second scene for incorporation into the media asset. For example, the media guidance application may determine that at the 15 minute mark in the play length of the media asset the user will be presented with the option to select one or more alternate scenes.

The media guidance application may generate for display a graphic representation of the option at the location. As an illustrative example, the media guidance application may overlay onto the progress bar an icon representing either one or both of the first and second scenes. In some embodiments, the graphic representation of the option may be generated for display during playback of the media asset and/or prior to playback of the media asset.

It should be noted that a graphic representation may, in some embodiments, include and/or correspond to video, audio, and/or textual data. For example, the graphic representation may include any object, sound, and/or word that communicates to a user the presence of and/or location of an option to select alternate scenes. For example, in some embodiments, a graphic representation may be located on a progress bar, and the location of the graphic representation on the progress bar may inform the user of the location of the option. In another example, the graphic representation (e.g., located next to a listing of a media asset) may only inform the user that the media asset includes an option for alternate scenes.

In some embodiments, the media asset may continue to play while the graphic representation is displayed to the user. In some embodiments, playback of the media asset may be automatically paused at the first point in the play length, and the graphic representation of the option may be generated for display while the playback of the media asset is paused. For example, in response to determining that an alternate scene is available, the media guidance application may pause play back of the media asset in order to allow the user to select an alternate scene.

In some embodiments, the media guidance application may automatically select the first scene for display after a period of time subsequent to pausing the playback of the media asset. For example, the media guidance application may wait for a timeout period of time before automatically selecting a default scene for display.

In some embodiments, the graphic representation of the option may inform the user about the content of the alternate scenes. For example, the graphic representation of the option may include a first thumbnail corresponding to the first scene and a second thumbnail corresponding to the second scene. Alternatively or additionally, the graphic representation of the option may include a description of the first scene and a description of the second scene.

In some embodiments, the media guidance application may inform the user about the content of the alternate scenes upon the user selecting a graphic representation of that scene. For example, the media guidance application may generate for display a description of the first scene and a description of the second scene upon a user selection of the graphic representation of the option.

In some embodiments, the media guidance application may alert the user to the approach of a point in the play length of the media asset at which alternate scenes are available. For example, the media guidance application may graphically accentuate the graphic representation of the option as playback of the media asset nears the first point in the play length. As used herein, to "graphically accentuate" the graphic representation means any change in visual characteristics of the graphic representation that visually distinguishes the graphic representation. For example, the media guidance application may graphically accentuate the graphic representation by altering the size, shape, color, animation, or otherwise visually distinguishing the graphic representation. As an illustrative example, the media guidance application may increase the size of the graphic representation by 50% and change the text to bold as playback of the media asset nears the first point in the play length.

As another illustrative example, the media guidance application may generate for display the graphic icon with only screenshots of the alternate scenes, and as playback nears the first point in the play length, the media guidance application may increase the size of the graphic representation and add text descriptions to each of the scenes. As yet another illustrative example, the media guidance application may generate for display the graphic representation as a dot overlaid onto the progress bar. As playback nears the first point in the play length, the media guidance application may change the graphic representation to display screenshots of each of the scenes available for incorporation at the first point. In this manner, the user's attention may be drawn towards the graphic representation before the first point in the play length in order to receive their input regarding a selectable portion of the media asset. It should be noted that in some embodiments a graphic representation may be graphically accentuated by modifying other characteristics of the graphic representation. For example, in some embodiments, graphically accentuating a graphic representation may including modifying audio and/or textual data associated with the graphic representation.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
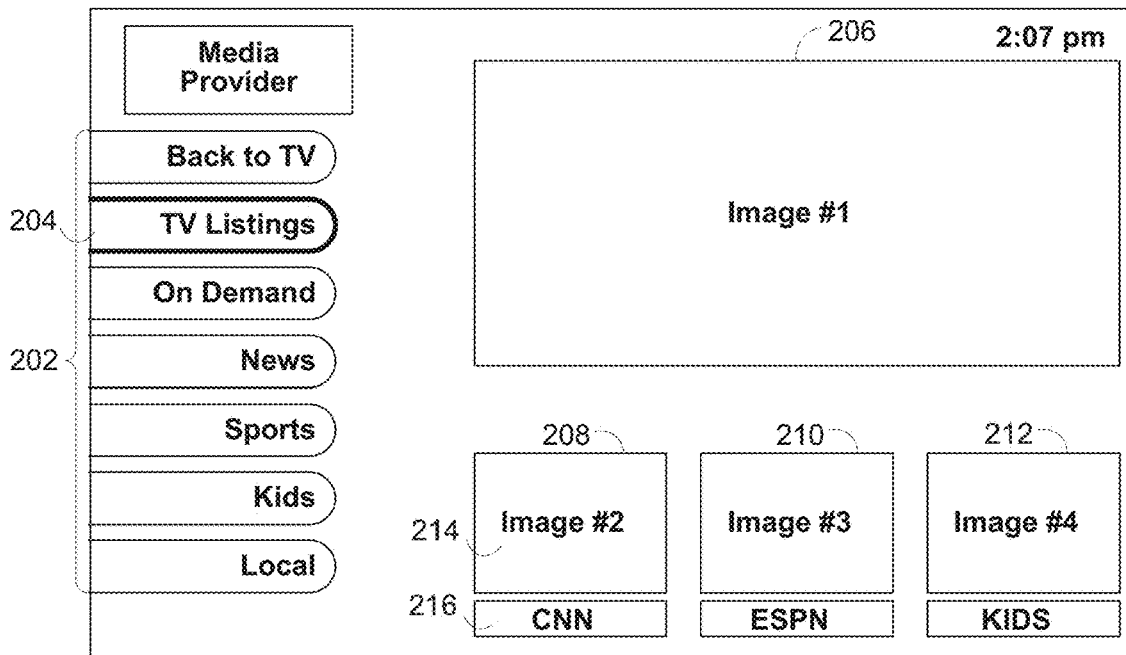
FIG. 2 shows another illustrative example of a display screen used to access media content in accordance with some embodiments of the disclosure.

FIGS. 1-2 show illustrative display screens that may be used to provide media guidance data and media assets. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criterion.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criterion. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
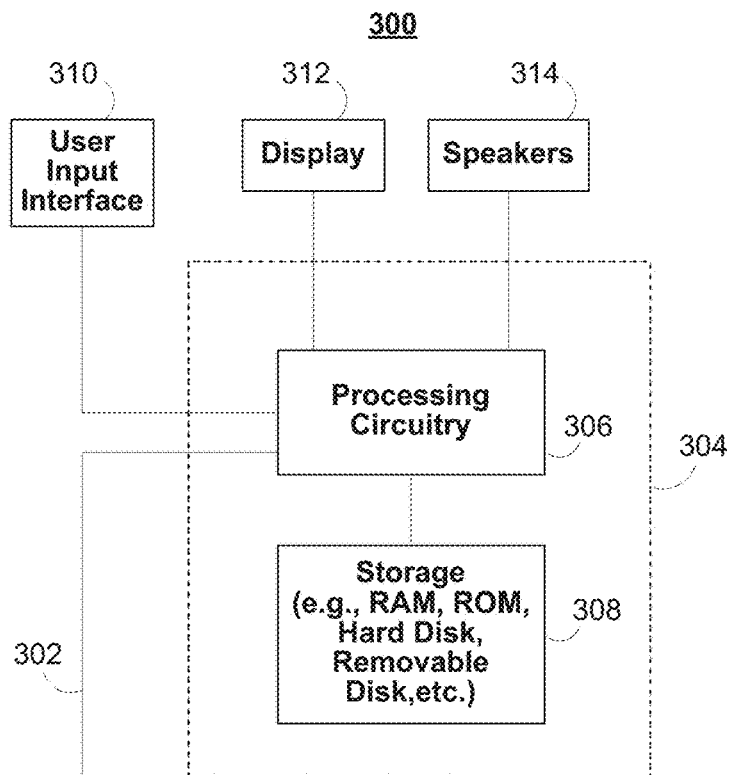
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D.

A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
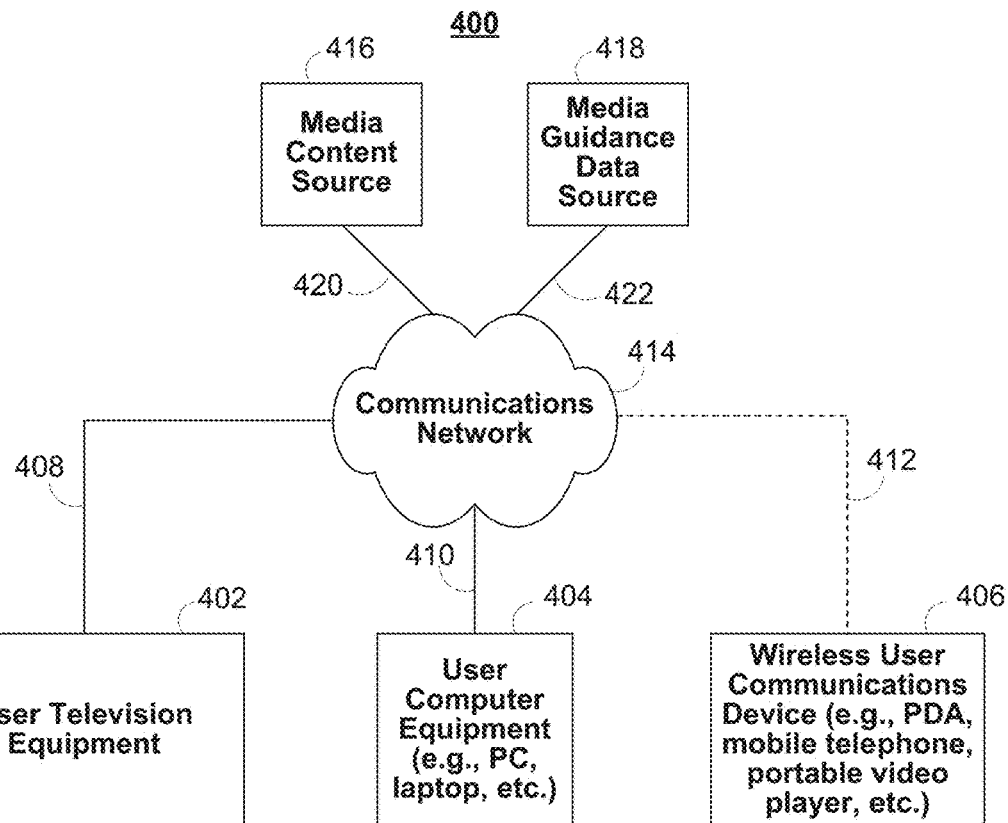
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
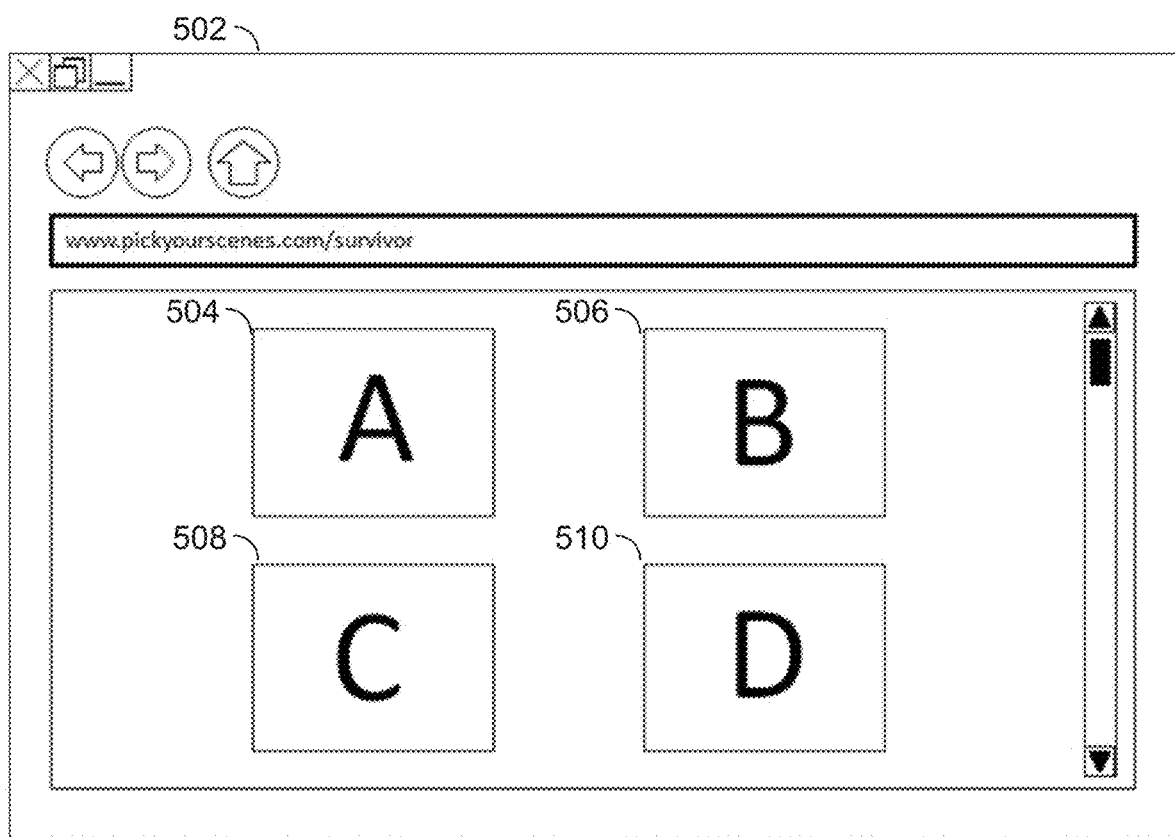
FIG. 5 shows an illustrative screen for selecting user selected scenes in accordance with some embodiments of the disclosure.

FIG. 5 shows an illustrative screen 500 for selecting user selected scenes in accordance with some embodiments of the disclosure. Screen 500 may include website 502, scene option A 504, scene option B 506, scene option C 508, and scene option D 510. Although screen 500 is depicted in FIG. 5 as being a website, screen 500 may be displayed in any suitable manner on any suitable user equipment, including, but not limited to, a user's television set top box, personal computer, mobile device, or tablet. For instance, screen 500 may be generated by a media guidance application running on a user's set top box in response to a user input.

Each of scene options 504 through 510 may correspond to a respective alternate scene. The user may select one of the four scene options 504 through 510 depicted on website 502. In some embodiments, the scene options may depict screenshots of the corresponding scene. For instance, the scene options 504 through 510 may depict an image or a short video clip of actual footage of the corresponding scene. In some embodiments, the scene options may depict images of video associated with the corresponding scene. For instance, each of the scene options 504 through 510 may depict an image or a short clip of a different character that is depicted in the corresponding scene. In this manner, the user may select scene(s) corresponding to a favorite character depicted in the television program. In some embodiments, each of scene options 504 through 510 corresponds to a series of scenes. In such embodiments, the user may input a single selection (e.g., the selection of a favorite character, theme, topic, or idea), and the media guidance application may automatically apply the selection to any option to select alternate scenes.

In some embodiments, the user selection may be transmitted to a content provider. In some embodiments, the user selection may be stored in a user profile associated with the user. For example, if the user selects option 504, then the user selection may be transmitted to a content provider, and the content provider may ensure that the media asset is provided to the user with scene A corresponding to option 504. In some embodiments, the content provider may transmit the media asset with scene A incorporated into the media asset. In some embodiments, the content provider may transmit the media asset with scene A and one or more of scenes B, C, and D. The content provider may also transmit data indicating the user selection of option 504. The user equipment may receive the media asset with scene A, one or more of scenes B, C, and D, and the data indicating the user selection, and based on the data indicating the user selection, generate for display the media asset with scene A incorporated at the appropriate point in playback.

In some embodiments, the user selection may be received with selections from other users, and either the first scene or the second scene may be selected based on the plurality of received user selections. For example, one or more users may select a particular scene from a plurality of available scenes for incorporation in a media asset. The media guidance application may determine which scene of the plurality of scenes was the most popular and incorporate that scene. In this manner, a user may "vote" for a scene for incorporation into the media asset, with the votes of a plurality of users being combined to select the most popular scene for incorporation into the media asset.

In some embodiments, the users that may select a particular scene may be associated with a particular group. For example, an option to vote for a particular scene may appear on a social network site associated with a user. For example, the option may be posted on a social network site and voted on by the social network friends of a user. In some embodiments, the social network site and/or the media guidance application may store user selections of alternate scenes and provide this information to other individuals in the user's social network. For example, the media guidance application may allow a user to choose similar or the same alternate scenes as those that a friend in a social network has chosen. As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

In some embodiments, the playback length of scenes A, B, C, and D may be the same. In such embodiments, scenes A, B, C, and D may be interchanged without affecting the overall play length of the media asset. In other embodiments, one or more of the scenes A, B, C, and D may have a different play length than the other scenes. In such embodiments, the incorporation of some of the scenes A, B, C, and D may cause the overall play length of the media asset to become longer and shorter, depending on which scene was incorporated into the media asset. For example, scene A may be a default scene with a playback length of 10 minutes. Scene B may be an alternate scene with a playback length of 15 minutes. If scene B is incorporated into the media asset instead of scene A, then the overall media asset may have a play length that is lengthened by five minutes. In some embodiments, the playback speed of an alternate scene may be adjusted (i.e., either slower of faster) in order to match a playback length of a default scene. Continuing the illustrative example from above, the playback speed of Scene B may be sped up by 33% in order to be incorporated into a 10 minute slot in the media asset, and thus maintain the default playback length (as if scene A were incorporated into the media asset).

Figure 6:
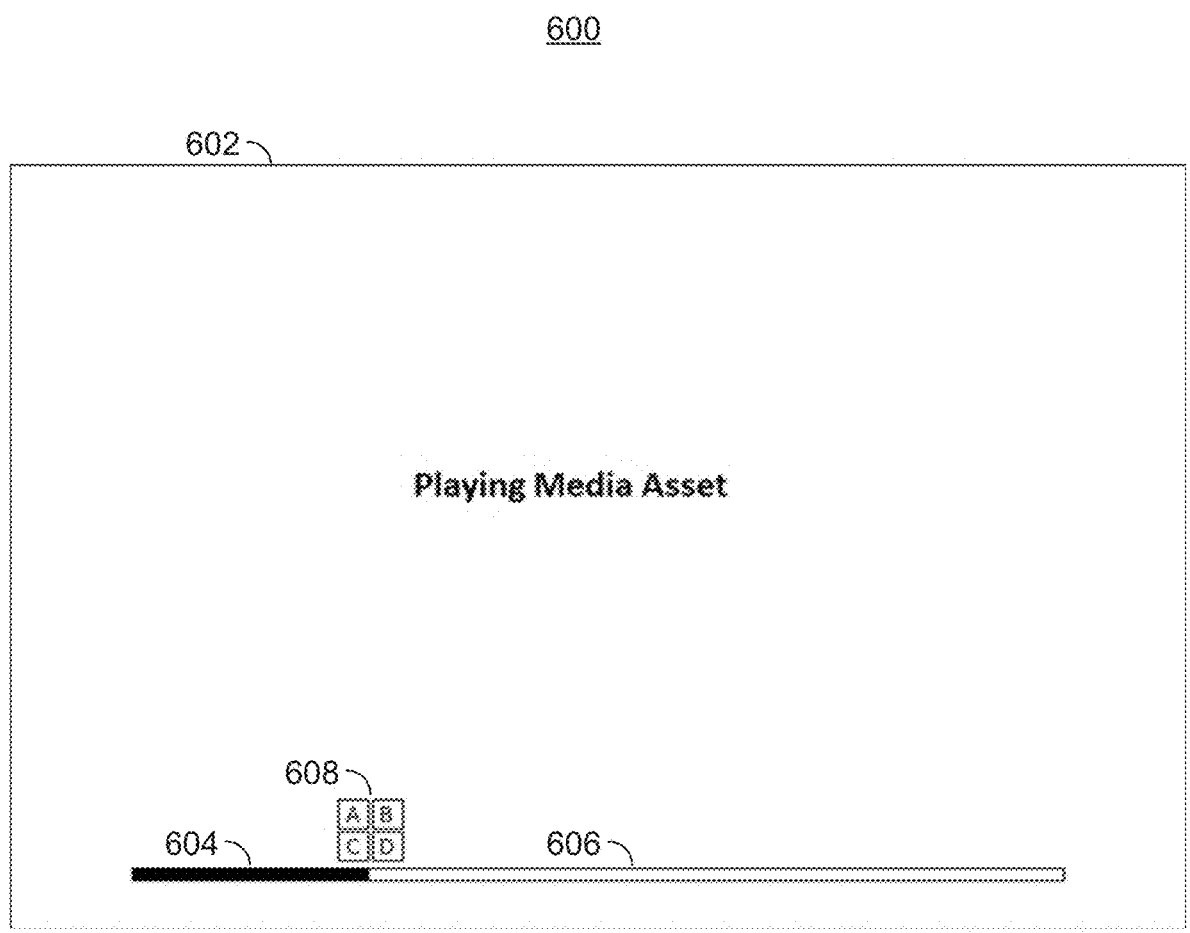
FIG. 6 shows an illustrative media progress screen in accordance with some embodiments of the disclosure.

FIG. 6 shows an illustrative media progress screen 600 in accordance with some embodiments of the disclosure. Media progress screen 600 may comprise media asset display area 602, progress bar 606, a progress indicator 604, and alternate scenes icon 608. The media asset display area 602 may comprise any suitable display area for presenting a media asset, and, in some embodiments, may comprise a majority of the display space available on display 312. In the illustrative example depicted in FIG. 6, the progress bar 606, progress indicator 604, and alternate scenes icon 608 are overlaid on top of the media asset display area 602 during playback of a media asset.

The progress bar 606 may comprise any suitable graphical icon that represents a play length of a media asset. While the progress bar 606 is depicted in FIG. 6 as a bar, the progress bar 606 could conceivably be any suitable shape, size, or color that is capable of representing a play length, including, but not limited to, a pie graph, a bar graph, or a timeline. The progress indicator 604 may indicate the user's current progress through the play length of the media asset. In some embodiments, the progress indicator 604 may be overlaid, either partially or completely, over the progress bar 606 during playback of the media asset. The progress indicator 604 may indicate the user's progress through the media asset. In some embodiments, the progress indicator 604 may be a graphical icon (e.g., dot, dash, vertical line, star, square, or other shape) that indicates the furthest point that a user has consumed in the media asset. In some embodiments, the progress indicator 604 may be displayed at any time the progress bar 606 is displayed. For example, the progress bar 606 and progress indicator 604 may be displayed during playback of the media asset. In other embodiments, the progress bar 606 and the progress indicator 604 may be displayed at the start of playback of the media asset and may fade out after a period of time (e.g., 10 seconds). In some embodiments, the progress bar 606 and progress indicator 604 may by displayed in response to a user input, such as pressing a button on a remote control, or when playback of the media asset approaches a selectable portion of the media asset. The progress bar 606 and progress indicator 604 may then fade out again after a period of time subsequent to the user input or selectable portion of the media asset.

For instance, in the illustrative example depicted in FIG. 6, the progress indicator 604 appears to partially fill the progress bar 606.

The alternate scenes icon 608 may comprise any suitable graphical display that indicates the availability of alternate scenes for selection by the user. The alternate scenes may also be listed as a series of images/screenshots, a list of text, selectable hyperlinks, selectable video clips, or any other visual display. In the illustrative example depicted in FIG. 6, the alternate scenes icon 608 is depicted with four rectangles representing the four alternate scenes A, B, C, and D for selection by the user. The rectangles labeled A, B, C, and D in FIG. 6 may be screenshots of the four scenes, representative images of the four scenes, and/or may comprise descriptions of the scenes A, B, C, and D. For example, labeled rectangles of alternate scenes icon 608 may be screenshots of actual footage from the four scenes. In some embodiments, the four rectangles may simply be an image of a character that is featured in the corresponding scene. In yet other embodiments, the labeled rectangles may include the name of a character which is featured in the corresponding scene. Furthermore, while the alternate scenes icon 608 depicted in FIG. 6 is shown to have four labeled rectangles, the alternate scenes icon 608 may conceivably have any size, shape, or color. In some embodiments, the alternate scenes icon 608 may simply by a dash, dot, or other shape that is overlaid onto the progress bar 606. The foregoing examples are provided for illustrative purposes only, and other examples of alternate scenes icon 608 suitable for indicating the availability of alternate scenes may be contemplated by one of ordinary skill in the art.

The alternate scenes icon 608 may be placed at a location on the progress bar that corresponds to a point in the play length where the alternate scene will be incorporated. In some embodiments, the alternate scenes icon 608 may be displayed throughout playback of the media asset. In other embodiments, the alternate scenes icon 608 may only be displayed when playback of the media asset nears the location on the progress bar that the alternate scene will be incorporated. For example, the alternate scenes icon 608 may be automatically generated for display in response to playback of the media asset approaching within a threshold time of the point that the alternate scene will be incorporated. In some embodiments, the user may select one of the labeled rectangles of alternate scenes icon 608 in order to select the corresponding alternate scene. In some embodiments, the user selection may be received at any time during playback of the media asset. In some embodiments, selection of the alternate scenes icon 608 may cause the display of a separate screen, such as screen 500 discussed above in relation to FIG. 5, in order to receive a user selection of an alternate scene.

Figure 7:
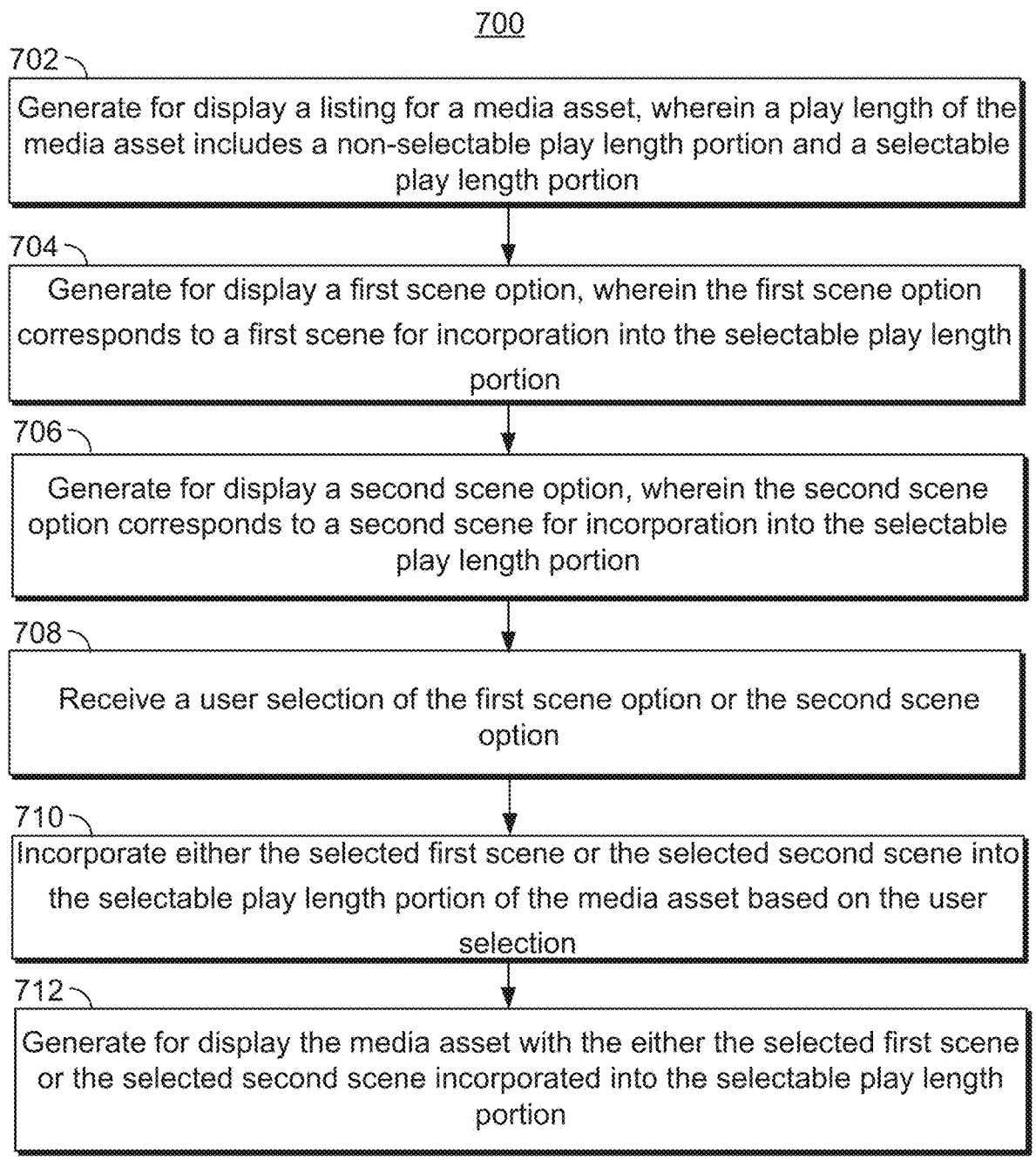
FIG. 7 is a flowchart of illustrative steps for presenting user selected scenes in accordance with some embodiments of the disclosure.

FIG. 7 is a flowchart of illustrative steps for presenting user selected scenes in accordance with some embodiments of the disclosure. Process 700 includes generating for display a listing for a media asset, wherein a play length of the media asset includes a non-selectable play length portion and a selectable play length portion at step 702, generating for display a first scene option, wherein the first scene option corresponds to a first scene for incorporation into the selectable play length portion at step 704, generating for display a second scene option, wherein the second scene option corresponds to a second scene for incorporation into the selectable play length portion at step 706, receiving a user selection of the first scene option or the second scene option at step 708, incorporating either the selected first scene or the selected second scene into the selectable play length portion of the media asset based on the user selection at step 710, and generating for display the media asset with the either the selected first scene or the selected second scene incorporated into the selectable play length portion at step 712.

At step 702, the media guidance application may generate for display (e.g., via control circuitry 304 (FIG. 3)) a listing for a media asset. The media guidance application may generate for display the listing in any suitable media guidance screen, such as screen 500 discussed above in relation to FIG. 5. The media asset may be associated with a play length including a non-selectable play length portion and a selectable play length portion. As discussed above, the non-selectable play length portion and selectable play length portion may comprise one or more scenes of the media asset.

At step 704, the media guidance application may generate for display (e.g., via control circuitry 304 (FIG. 3)) a first scene option, wherein the first scene option corresponds to a first scene for incorporation into the selectable play length portion. In some embodiments, the first scene may be a default scene for incorporation into the media asset. For instance, the first scene may be a scene which was selected by an original creator of the media asset or content provider to be incorporated into the media asset, and absent any user selection, may be incorporated into the media asset for viewing by all users. The first scene may be configured for incorporation into the selectable play length portion by beginning playback of the first scene at a start time of the selectable play length portion and stopping playback of the first scene (or concluding playback of the first scene) at a stop point of the selectable play length portion.

At step 706, the media guidance application may generate for display (e.g., via control circuitry 304 (FIG. 3)) a second scene option, wherein the second scene option corresponds to a second scene for incorporation into the selectable play length portion. In some embodiments, the second scene option may correspond to an alternate scene for incorporation into the media asset. For instance, the second scene may be associated with characteristics which are more preferable to the user than the characteristics of the first scene. As with the first scene, the second scene may be configured for incorporation into the selectable play length portion by beginning playback of the second scene at a start time of the selectable play length portion and stopping playback of the second scene (or concluding playback of the second scene) at a stop point of the selectable play length portion. In some embodiments, the duration of the first scene is identical to the duration of the second scene. In other embodiments, the duration of the first scene is different than the duration of the second scene. As an illustrative example, the first scene may be associated with a first character of a reality television show, and the second scene may be associated with a second character of the reality television show. While the media asset was originally configured to display the first scene about the first character, the user may be more interested in the second character, and thus may prefer to incorporate the second scene rather than the first scene into the media asset.

At step 708, the media guidance application may receive (e.g., via control circuitry 304 (FIG. 3)) a user selection of the first scene option or the second scene option. As discussed above, the user selection may be received at any suitable time, including before playback of the media asset begins, during playback of the media asset, while the media asset is paused, or after playback of the media asset. For example, the user selection may be received through a website, such as website 502 depicted in FIG. 5. As another example, the media guidance application may automatically pause the media asset at the start of a selectable portion of the media asset and present several options for alternate scenes. The user may select one of several options, and in response, the media guidance application may receive the selected scene, either from local memory (e.g., memory 308 (FIG. 3)) or from a remote source (e.g., media content source 416 (FIG. 4)). In some embodiments, the user selection may be received prior to a broadcast time of the media asset. In such embodiments, the media asset may be transmitted by a content provider and received by a user equipment with the selected scene already incorporated into the media asset.

At step 710, the media guidance application may incorporate (e.g., via control circuitry 304 (FIG. 3)) either the selected first scene or the selected second scene into the selectable play length portion of the media asset based on the user selection. The selected scene may be incorporated by replacing media between a start time and a stop time of the selectable play length portion. In some embodiments, the selected scene may be truncated or augmented (e.g., by adding additional material or by slowing playback speed) in order to match the duration of the selectable play length portion. In some embodiments, the selected scene may be incorporated into the media asset before transmission by a content provider. In some embodiments, the selected scene may be incorporated into the media asset subsequent to receipt of the media asset by a user equipment. In such embodiments, the media asset may be transmitted with at least one of the first or second scenes, or the first and second scenes may be downloaded from a remote source. In some embodiments, the first and/or second scenes may be downloaded in response to receiving the user selection of the first or second scene. At step 712, the media guidance application may generate for display (e.g., via control circuitry 304 (FIG. 3)) the media asset with the either the selected first scene or the selected second scene incorporated into the selectable play length portion.

Figure 8:
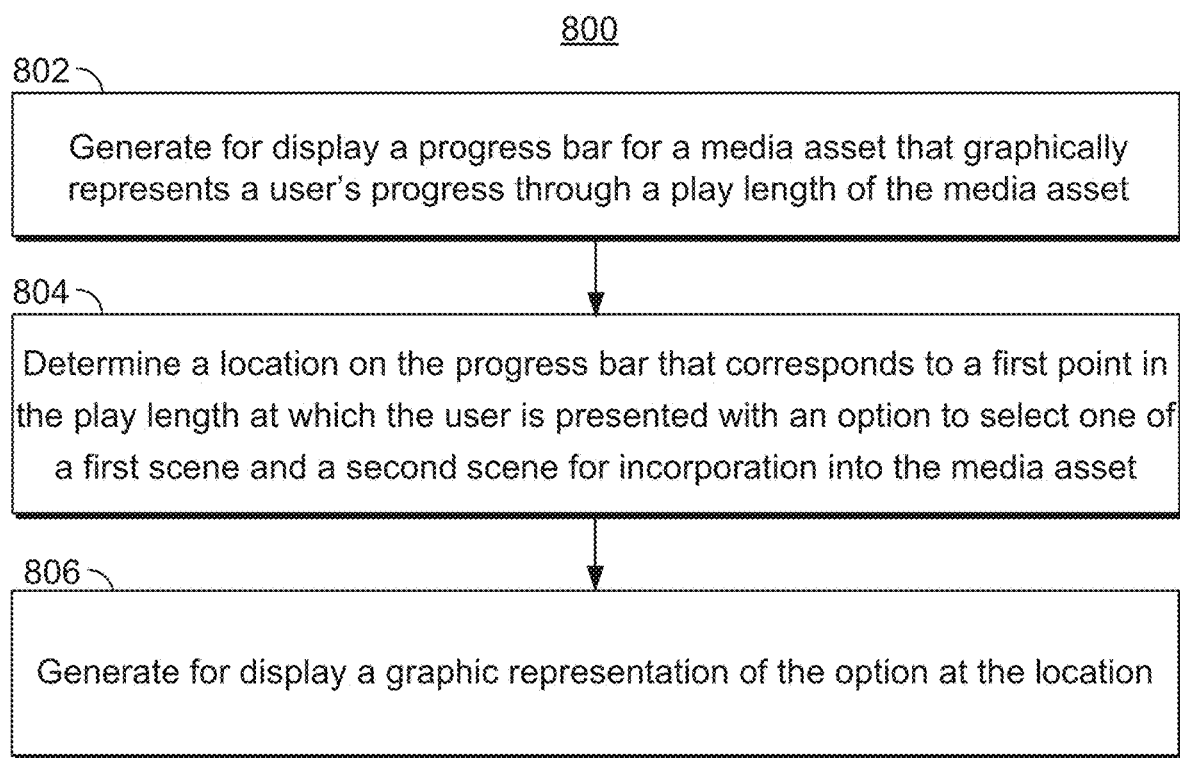
FIG. 8 is a flowchart of another set of illustrative steps for presenting user selected scenes in accordance with some embodiments of the disclosure.

FIG. 8 is a flowchart 800 of illustrative steps for presenting user selected scenes in accordance with some embodiments of the disclosure. Process 800 includes generating for display a progress bar for a media asset that graphically represents a user's progress through a play length of the media asset at step 802, determining a location on the progress bar that corresponds to a first point in the play length at which the user is presented with an option to select one of a first scene and a second scene for incorporation into the media asset at step 804, and generating for display a graphic representation of the option at the location at step 806.

At step 802, the media guidance application may generate for display (e.g., via control circuitry 304 (FIG. 3)) a progress bar for a media asset that graphically represents a user's progress through a play length of the media asset. As discussed above in relation to FIG. 6, the progress bar may be any shape, size, or color suitable for representing the play length of the media asset. In some embodiments, the progress bar may be overlaid over the media asset during playback. The progress bar may disappear after a period of time and may be subsequently generated for display in response to a user input.

At step 804, the media guidance application may determine (e.g., via control circuitry 304 (FIG. 3)) a location on the progress bar that corresponds to a first point in the play length at which the user is presented with an option to select one of a first scene and a second scene for incorporation into the media asset. In some embodiments, the location may correspond to a start time associated with a selectable portion of a media asset. In some embodiments, the media guidance application may receive the media asset with metadata indicating the start and/or stop times of selected portions of the media asset. For example, the media asset may have embedded triggers that indicate the start of a selectable portion of the media asset. In response to detecting a trigger, the media guidance application may present the user with an option to select one of the first scene and the second scene for incorporation into the media asset. In other embodiments, the media guidance application may receive the media asset and one or more of the alternate scenes. The alternate scenes may indicate an intended start and/or stop time for incorporation during playback of the media asset. The media guidance application may monitor, for each alternate scene, their start and/or stop time, and in response to detecting a start/stop time, determine whether the user should be presented with an option to select one of the first scene or the second scene. In some embodiments, the media guidance application may monitor the start/stop times of each available alternate scene prior to the start of playback of the media asset and compile a list of trigger points during the play length of the media asset. When playback approaches a trigger point, the media guidance application may determine whether the user should be presented with the option to select one of the alternate scenes.

At step 806, the media guidance application may generate (e.g., via control circuitry 304 (FIG. 3)) for display a graphic representation of the option at the location. As discussed above in relation to FIG. 6, the icon may be any shape, size, or color suitable for representing the option to select an alternate scene. In some embodiments, the graphic representation may include a sub-icon corresponding to each scene available for selection. The user may select a sub-icon in order to select a desired preferred alternate scene. In some embodiments, selection of the graphic representation may result in the display of a separate screen, such as screen 500 discussed above in relation to FIG. 5, in order to receive a user's selection of an alternate scene.

Figure 9:
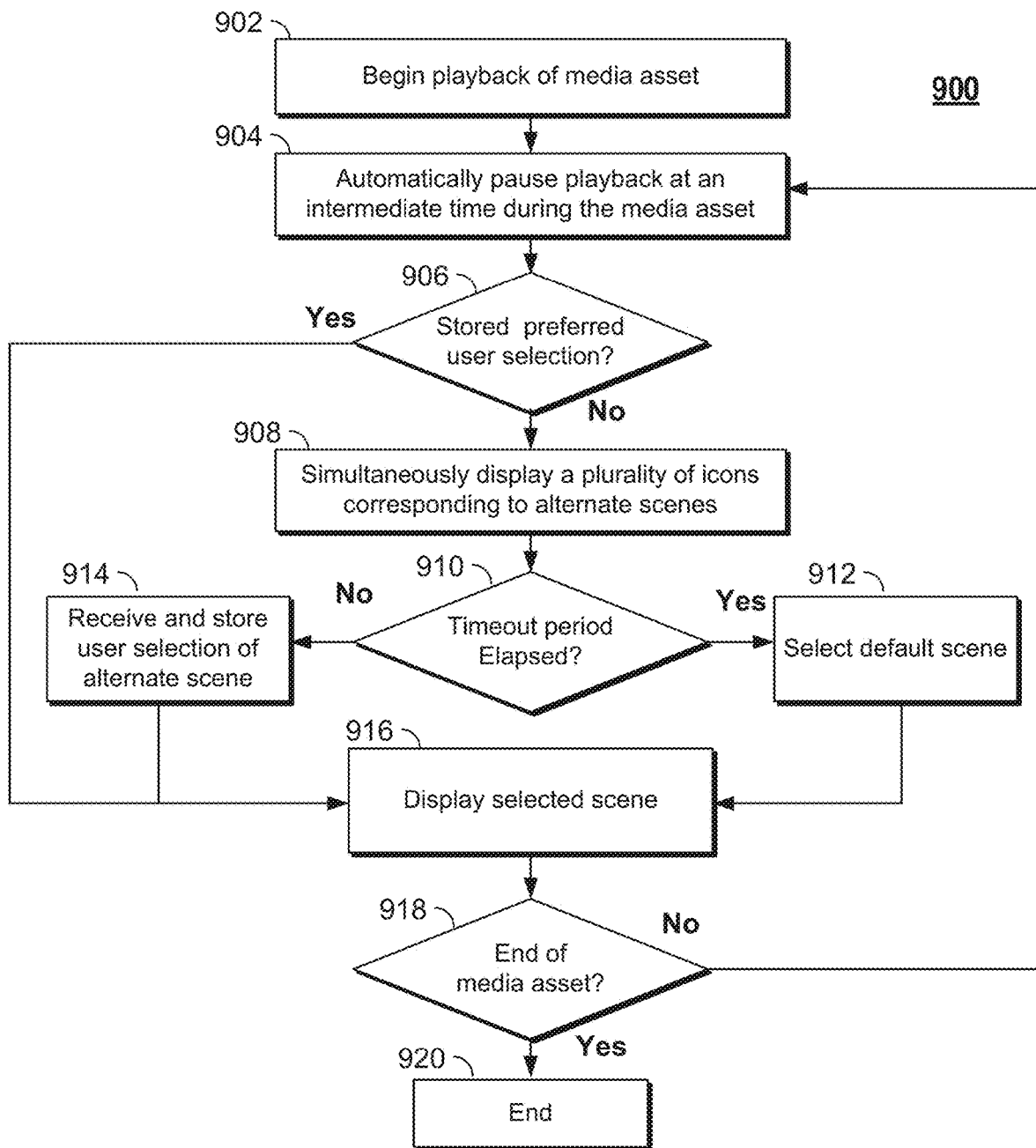
FIG. 9 is a flowchart of another set of illustrative steps for presenting user selected scenes in accordance with some embodiments of the disclosure.

FIG. 9 is a flowchart 800 of illustrative steps for presenting user selected scenes in accordance with some embodiments of the disclosure. Process 900 includes beginning playback of a media asset at step 902, automatically pausing playback at an intermediate time during the media asset at step 904, determining whether a preferred user selection is stored at step 906, simultaneously displaying a plurality of icons corresponding to alternate scenes at step 908, determining whether a timeout period has elapsed at step 910, selecting a default scene at step 912, receiving and storing a user selection of an alternate scene at step 914, displaying a selected scene at step 916, determining whether the media asset has ended at step 918, and terminating at step 920.

At step 902, playback of a media asset may begin. The media asset may be generated by media guidance application (e.g., via control circuitry 304 (FIG. 3)) for display on, for example, display 312 (FIG. 3). The media may begin with a non-selectable portion, such as a default portion that is intended for viewing by all consumers of a media asset. As an illustrative example, the media asset may be a reality television program that begins with a scene involving the entire cast of members. At step 904, playback of the media asset may be automatically paused at a point in the play length of the media asset. The point in the play length of the media asset may correspond to a start point of a selectable portion of the media asset. For instance, the user may be able to select from one of several alternate scenes at the point in the play length of the media asset. Continuing the illustrative example from above, the reality television program may display, after the introductory group scene, scenes at various different locations. The user may be interested in some locations more than others, for instance Hawaii, over New York City, and may desire to select scenes associated with Hawaii rather than New York. At step 906, the media guidance application may determine whether a preferred user selection is stored. The media guidance application may check either local storage (e.g., storage 308 (FIG. 3)) or remote storage (e.g., media content source 416 (FIG. 4)) for any stored user preferences or user profiles. As an illustrative example, the media guidance application may have stored in local memory a list of prior user selections of alternate scenes. As another example, the media guidance application may access a user profile associated with the user and determine that the user has indicated an interest in science fiction and action genres and has previously lived in Hawaii, and thus is likely to be interested in action scenes associated with Hawaii. In some embodiments, the preferred user selection may be the selection of an alternate scene at a prior time. In some embodiments, the preferred user selection may be the selection of metadata associated with the media asset, such as a favorite character, location, genre, topic, actor/actress, or theme. If a preferred user selection is stored, then the media guidance application may select a scene according to the preferred user selection and display the selected scene at step 916. For example, if the user had previously selected an alternate scene (e.g., via website 502 (FIG. 5)), the media guidance application may retrieve the user selection and automatically display the selected scene. If the preferred user selection was of metadata associated with the media asset, then the media guidance application may automatically select (e.g., via control circuitry 304 (FIG. 3)) a scene according to the selected metadata and automatically display the selected scene at step 916.

If no preferred user selection was stored, the media guidance application may simultaneously display (e.g., via display 312 (FIG. 3)) a plurality of icons corresponding to alternate scenes. As discussed above in relation to FIG. 6, the plurality of icons may be overlaid onto a progress bar representing a user's progress through the playback of the media asset. In some embodiments, the plurality of icons may be overlaid onto the progress bar at a point corresponding to the start time of the selectable portion of the media asset. After display of the plurality of icons, the media guidance application may determine (e.g., via control circuitry 304 (FIG. 3)) whether a timeout period has elapsed. The timeout period may be a predetermined period of time (e.g., 10 seconds) where the media guidance application monitors for a user selection. If the timeout period elapses without a user selection, then a default scene is automatically selected at step 912. If the user selects a scene prior to the timeout period elapsing, then the media guidance may receive (e.g., via control circuitry 304 (FIG. 3) the user selection of the alternate scene and store the user selection (e.g., in storage 308 (FIG. 3)) at step 914.

At step 916, the media guidance application may display (e.g., on display 312 (FIG. 3)) the selected scene. After the selected scene is displayed, the media guidance application may continue playback of the media asset and determine (e.g., via control circuitry 304 (FIG. 3)) whether the media asset has ended at step 918. If the media asset has not yet ended, then the media guidance application may return to step 904 and automatically pause playback of the media asset at a second intermediate time. If the media asset has ended, then the media guidance application will terminate process 900 at step 920.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a plurality of scenes in a video asset, wherein a selected scene of the plurality of scenes corresponds to a time in the video asset;
   causing, simultaneously at a user interface of each of a plurality of devices, to be displayed a plurality of interface elements, each interface element of the plurality of interface elements corresponding to a scene of the plurality of scenes, each interface element of the plurality of interface elements depicting a graphic captured from the corresponding scene of the plurality of scenes;
   receiving, before expiration of a timeout period, a first plurality of selections from the user interface of each of a first subset of the plurality of devices corresponding to a first scene of the plurality of scenes;
   receiving, before the expiration of the timeout period, a second plurality of selections from the user interface of each of a second subset of the plurality of devices corresponding to a second scene of the plurality of scenes;
   determining, based at least in part on the first plurality of selections from the first subset of the plurality of devices having more selections than the second plurality of selections from the second subset of the plurality of devices before expiration of the timeout period, the first scene as the selected scene to be displayed at the corresponding time in the video asset; and causing to be displayed the selected scene at the corresponding time in the video asset.

2. The method of claim 1, wherein the plurality of interface elements is displayed at the user interface of each of the plurality of devices via a social network.

3. The method of claim 2, wherein the plurality of interface elements is part of a voting interface via the social network.

4. The method of claim 2, wherein the plurality of interface elements is associated with a user profile at the social network.

5. The method of claim 4, further comprising:
storing, at a social media server, the first plurality of selections and the second plurality of selections; and
transmitting data about the stored first plurality of selections and the stored second plurality of selections to a user device associated with the user profile.

6. The method of claim 1, wherein each interface element of the plurality of interface elements comprises one of a cover art, a video clip, a thumbnail, a still image, or a live video from the corresponding scene.

7. The method of claim 1, wherein the graphic depicts a character in the corresponding scene.

8. The method of claim 1, wherein the plurality of interface elements is caused to be displayed prior to the corresponding time during playing of the video asset.

9. The method of claim 8, further comprising automatically pausing the playing of the video asset at the corresponding time to receive a selection via the plurality of interface elements when no selection has been made prior to the time.

10. The method of claim 1, wherein the selected scene is caused to be displayed seamlessly with display of the video asset.

11. A system comprising:
display circuitry configured to display video; and
control circuitry configured to:
determine a plurality of scenes in a video asset, wherein a selected scene of the plurality of scenes corresponds to a time in the video asset;
cause, simultaneously at a user interface of each of a plurality of devices, to be displayed a plurality of interface elements, each interface element of the plurality of interface elements corresponding to a scene of the plurality of scenes, each interface element of the plurality of interface elements depicting a graphic captured from the corresponding scene of the plurality of scenes;
receive, before the expiration of the timeout period, a first plurality of selections from the user interface of each of a first subset of the plurality of devices corresponding to a first scene of the plurality of scenes;
receive, before the expiration of a timeout period, a second plurality of selections from the user interface of each of a second subset of the plurality of devices corresponding to a second scene of the plurality of scenes;
determine, based at least in part on the first plurality of selections from the first subset of the plurality of devices having more selections than the second plurality of selections from the second subset of the plurality of devices before the expiration of the timeout period, the first scene as the selected scene to be displayed at the corresponding time in the video asset; and
cause, to be displayed via the display circuitry, the selected scene at the corresponding time in the video asset.

12. The system of claim 11, wherein the plurality of interface elements is displayed at the user interface of each of the plurality of devices via a social network.

13. The system of claim 12, wherein the plurality of interface elements is part of a voting interface via the social network.

14. The system of claim 12, wherein the plurality of interface elements is associated with a user profile at the social network.

15. The system of claim 14, wherein the control circuitry is further configured to:
store, at a social media server, the first plurality of selections and the second plurality of selections; and
transmit data about the stored first plurality of selections and the stored second plurality of selections to a user device associated with the user profile.

16. The system of claim 11, wherein each interface element of the plurality of interface elements comprises one of a cover art, a video clip, a thumbnail, a still image, or a live video from the corresponding scene.

17. The system of claim 11, wherein the graphic depicts a character in the corresponding scene.

18. The system of claim 11, wherein the plurality of interface elements is caused to be displayed prior to the corresponding time during playing of the video asset.

19. The system of claim 18, wherein the control circuitry is further configured to:
automatically pause the playing of the video asset at the time to receive a selection via the plurality of interface elements when no selection has been made prior to the corresponding time.

20. The system of claim 11, wherein the selected scene is caused to be displayed seamlessly with display of the video asset.

* * * * *